(No Model.)
J. S. COCHENNOUR.
VEHICLE SPRING SUPPORT.
No. 381,111. Patented Apr. 17, 1888.
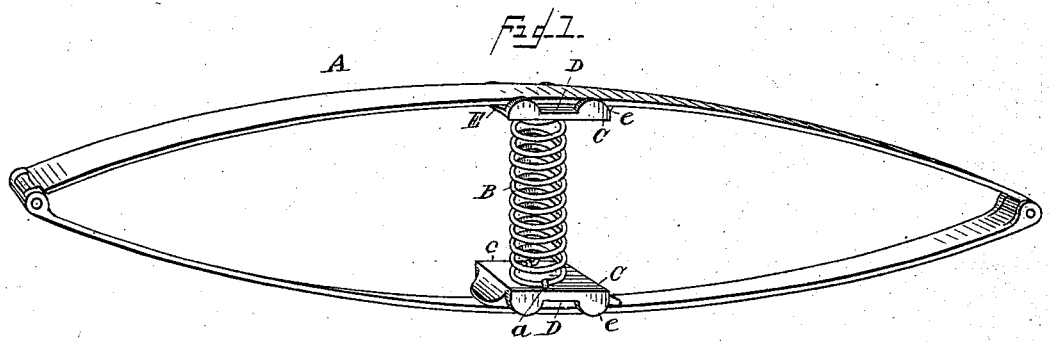
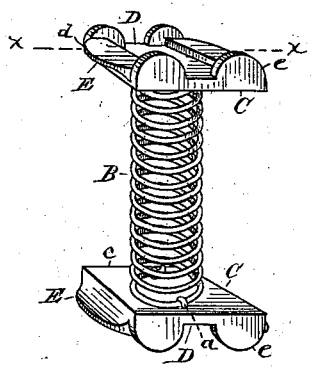
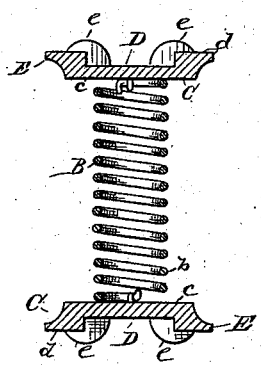
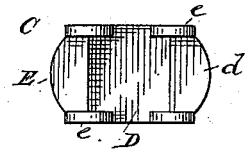
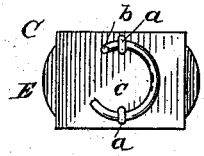
Witnesses.
H. D. Nealy
L. Jackson
Inventor,
John S. Cochennour.
By his Attorney,
M. D. Peck.

United States Patent Office.

JOHN S. COCHENNOUR, OF OLNEY, ILLINOIS.

VEHICLE-SPRING SUPPORT.

SPECIFICATION forming part of Letters Patent No. 381,111, dated April 17, 1888.

Application filed December 16, 1887. Serial No. 258,088. (No model.)

*To all whom it may concern:*

Be it known that I, JOHN S. COCHENNOUR, a citizen of the United States, residing at Olney, in the county of Richland and State of Illinois, have invented certain new and useful Improvements in Vehicle-Spring Supports; and I do hereby declare the following to be a full, clear, and exact description of the invention, such as will enable others skilled in the art to which it appertains to make and use the same, reference being had to the accompanying drawings, which form part of this specification.

My invention relates to an improved device for supporting springs of vehicles and other springs adapted to their use, and has for its object to provide a self-holding spring-support that is easily and quickly adjusted to a stationary vehicle-spring when additional strength in the spring is desired, and one that is provided with means for retaining itself upon the stationary spring without being permanently secured thereto; and it consists in the construction hereinafter described, and more particularly pointed out in the claims.

Referring to the drawings, Figure 1 represents a perspective view of an elliptic spring for vehicles with my improved spring-support applied thereto ready for use. Fig. 2 is a perspective view of the spring-support removed. Fig. 3 is a vertical section of the spring-support and its attachments on the line $x\ x$ of Fig. 2. Fig. 4 is a top and bottom or outer view of the flanged plate secured upon the ends of the spring-support, and Fig. 5 is an inner view of the flanged plate, showing the means of attachment of the spring-support thereto.

Like letters of reference indicate corresponding parts in each figure in the drawings.

A represents an ordinary elliptic spring which is used on vehicles of various kinds, and which may be provided with additional re-enforcing leaves, if desired. In the manufacture of these springs heretofore, it has been found necessary to make them of such weight and strength as is required for all purposes of the vehicle upon which they are placed, so that the load must be reduced to the capacity of the spring when inclined to be too great, and increased when too small, in order to receive the benefit of the spring, or to place some permanent support between the upper and lower leaves. To overcome these objections I provide a supplemental spring-support, B, which is preferably made of heavy coiled wire, though it may be of any other suitable material, as rubber. This coil, unsupported internally by any bolt or pin, is made of a length equal to the widest or central space between the upper and lower leaves of the elliptic spring A.

On each end of the coiled spring B there is secured a flanged plate, C, for the purpose of holding the spring-support in place when required for use, and which admits of its ready detachment and removal by simple compression of the spring-support when it is not needed to strengthen the stationary spring of the vehicle.

The plates C are rectangular in form, their longest side being adapted to fit a portion of the length of the elliptic spring. The inner parts, $c$, of the plates, or those next to the coil-spring B, are made with a smooth surface and are provided with staples $a$ near each side thereof, which extend through and are fastened down upon the plate. These staples admit the ends $b$ of the coil-spring, which is turned around from one to the other of the staples until it binds upon the coil, when the ends may be slightly turned or bent away from the plate, locking the coil securely upon the plates and preventing any accidental removal therefrom.

The outer parts of the plates C, or those that come in contact with the stationary spring of the vehicle, are recessed at D to admit the heads of the bolts, securing the leaves of the elliptic spring or the spring-bar thereto, when the spring-support is applied, which obviates any tendency of the support to work in either direction upon the spring A after it is in place.

The ends of the plates C are beveled from the inner surface to the outer plane, $d$, of the recess, and are made to form elongated supports E, that extend outward from the ends of the plates at right angles to the coil-spring and rest upon the inner surface of the spring A, while upon the plates at each side of the recess and supports E there are projecting ears or flanges $e$, that extend beyond the supports E and outer plane, $d$, of the recess in the same direction of the length of the coil-spring, and are adapted to fit closely upon the edges of the leaves of the elliptic spring A when the support is applied thereto.

In operation, when it is desired to place upon the vehicle a greater load than the springs thereof were constructed to bear, the supporting-spring, which may be kept in the box of the vehicle when not required for use, is readily inserted by placing one of the plates C over the center of the lower leaf of the elliptic or stationary spring and the head of the bolt holding it to the axle or spring-bar, and then compressing the coil B until the other plate is adjusted under the upper leaf, when, by the force of its own expansion, the coiled support will be securely held in position until the additional load is removed from the vehicle, when the support is easly removed by reversing the above-named operation.

Having thus fully described my invention, what I claim as new, and desire to secure by Letters Patent of the United States, is—

1. A self-holding support for stationary springs of vehicles, consisting of a coiled spring having flanged plates secured to its ends, said plates having elongated supports to rest upon the inner side, and projecting ears or flanges to fit closely upon the edges of the leaves of the stationary spring, as set forth.

2. A self-holding support for stationary springs of vehicles, consisting of a coiled spring having flanged plates secured to its ends by staples over the coil, said plates having recesses in their outer sides, with elongated supports extending therefrom at right angles to the coil, and ears or flanges on the sides of the plates in the same direction with the coil, to fit upon the edges of the stationary spring, as set forth.

3. An adjustable support for stationary springs of vehicles, consisting of a coiled spring having flanged plates secured to its ends by staples in the sides of the plate over the coil, the ends of said coil being turned or bent from the plates, the outer side of the plates being provided with recesses having elongated supports extending from the outer plane thereof at right angles to the coil, and the sides of the plates having ears or flanges extending from the sides of the lower part of the recess on the sides and beyond the supports in the direction of the coil, as set forth.

In testimony whereof I affix my signature in presence of two witnesses.

JOHN S. COCHENNOUR.

Witnesses:
C. H. SAGER,
LOUIS NICHOLS.